Sept. 8, 1959 P. H. VALENTYNE ET AL 2,902,950
DOUGH DIVIDING APPARATUS
Filed Sept. 28, 1956 3 Sheets-Sheet 1

FIG. I

INVENTORS
PETER H. VALENTYNE
CHESTER A. SUNDBOM
BY
ATTORNEYS

Sept. 8, 1959  P. H. VALENTYNE ET AL  2,902,950
DOUGH DIVIDING APPARATUS
Filed Sept. 28, 1956  3 Sheets-Sheet 2

INVENTORS
PETER H. VALENTYNE
CHESTER A. SUNDBOM
BY
Pearman & Pearman
ATTORNEYS

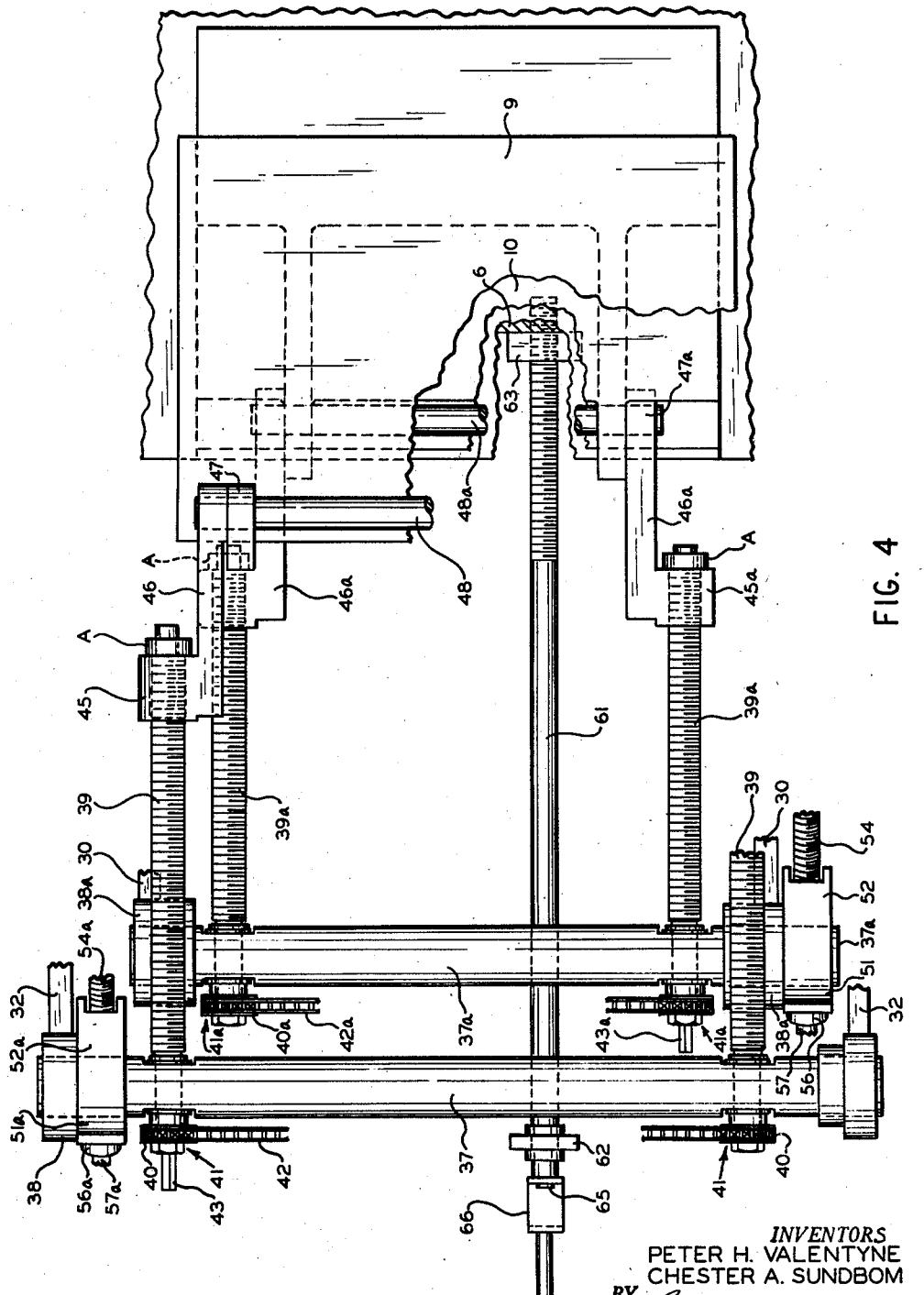

United States Patent Office 2,902,950
Patented Sept. 8, 1959

2,902,950

DOUGH DIVIDING APPARATUS

Peter H. Valentyne and Chester A. Sundbom, Saginaw, Mich., assignors to Baker Perkins Inc., Saginaw, Mich., a corporation of New York Application September 28, 1956, Serial No. 612,606

16 Claims. (Cl. 107—15)

This invention relates to dough dividing apparatus of the kind in which a dough supply is contained in a hopper from which pieces may be severed by a reciprocating knife and discharged into a pressure chamber for subsequent forcible ejection by a reciprocating ram into a measuring cylinder carried by a division box. From the measuring cylinder the dough is discharged to a suitable conveyer for transport to the next dough processing stage. The several parts referred to in apparatus of the kind to which the invention relates must be cleaned periodically in accordance with necessity or health agency regulations, but in cleaning such parts heretofore difficulty has been experienced due to the necessity of having to dismantle a portion of the apparatus and handle such heavy parts as the knife and ram members manually. Moreover, the partial dismantling of the apparatus is time consuming, whereas the manual handling of the parts occasionally may result in a not thoroughly clean machine after the parts are reassembled. In known machines it is not possible to separate all of the parts between which dough passes, such as the hopper, the pressure chamber, and the division box, a distance sufficient to enable these parts to be cleaned easily without being dismantled. Thus the cleaning of these parts when necessary or required also has been a time consuming and difficult task heretofore. An object of this invention, therefore, is to provide dough dividing apparatus which is free of the foregoing objections.

Another object of the invention is to provide dough dividing apparatus of the kind referred to in which such heavy members as the knife and the ram may be displaced from their operating positions, located in positions easily accessible for cleaning and returned to their operating positions without the necessity of manual handling of the parts.

Another object of the invention is to provide dough dividing apparatus in which the hopper and the pressure chamber may be moved a sufficient distance from the division box to enable each of these parts to be easily accessible for cleaning and lubrication.

A further object of the invention is to provide dough dividing apparatus embodying the foregoing advantages, but retaining may structural characteristics and arrangements of parts found in existing machines, thereby enabling presently existing manufacturing facilities and machine parts to be used in the construction of apparatus according to the invention.

Other objects and advantages of the invention will be pointed out specifically or will become apparent from the following description taken in conjunction with the appended claims and the accompanying drawings, in which:

Figure 4 is a fragmentary top plan view, partly in section, of the machine, the top cover plate being removed.

Figure 1:
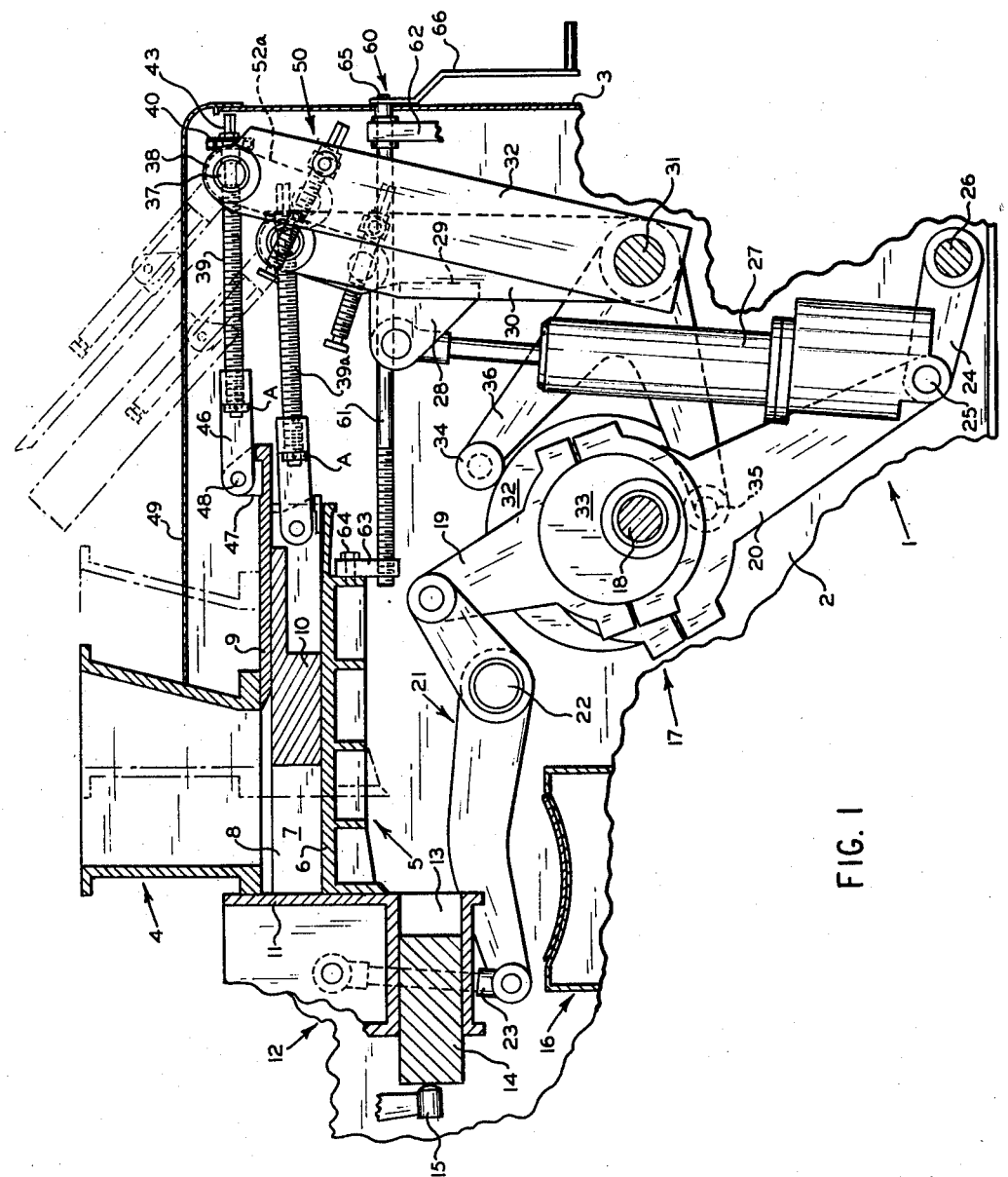
Figure 1 is a fragmentary view, partly in side elevation and partly in cross-section of a known dough dividing machine equipped with apparatus constructed in accordance with the invention.
Figure 2:
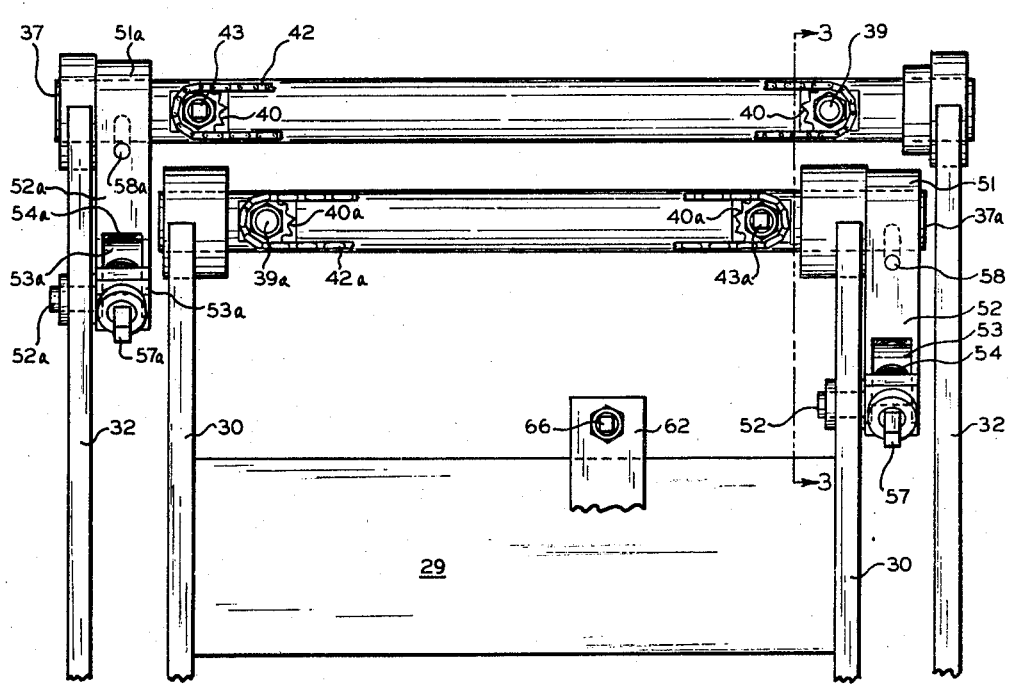
Figure 2 is a fragmentary rear elevation of the machine shown in Figure 1.

The invention is disclosed in the drawings as being incorporated in a dough dividing machine of the general class typified by U.S. Patent No. 1,871,264 granted August 9, 1932. The machine includes a frame 1 having side members 2 and front and rear members 3 which provide support for the elements of the machine. The drawings include some, but not all of the elements incorporated in known dough dividing machines as it is not necessary to do so for a clear understanding of the present invention. Briefly, the known elements disclosed in the drawings include an open top hopper part 4 which is connected in a known manner to a horizontally positioned top box or table part 5 having a flat upper surface 6 and upstanding side walls 7 defining a chamber 8 open at both ends and in communication through its top with the interior of the hopper part. The table part 5 is supported on suitable guideways carried by the frame 1 to enable both the parts 4 and 5 to be moved fore and aft of the frame by means and for a purpose yet to be described. Sufficient clearance is provided between the bottom of the hopper and the upper surface of the table part to accommodate therebetween a knife member 9 and a ram member 10, both of which are reciprocable along substantially horizontal, parallel paths. The knife member is operable to sever dough discharged from the hopper into the pressure chamber 8 and the ram is operable to compress the severed dough between itself and one wall 11 of a dough division box 12, which, in one position closes the forward part of the pressure chamber, but which is vertically reciprocable in guides carried by the frame to position measuring pockets 13 in alignment with the chamber 8 so that dough may be propelled from the latter into the pockets 13. Each of the pockets 13 contains an ejecting piston 14 which may be operated at timed intervals by suitable known actuating means 15 to eject dough pieces from the pockets onto a conveyer structure 16 or the like which may carry the dough pieces to the next processing stage. The ejecting apparatus 15 could be the kind disclosed in either the patent referred to above or U.S. Patent No. 1,981,151, granted November 20, 1934, or any other known kind.

As is to be expected where known apparatus is modified to accommodate new elements and combinations of elements, there is some overlapping of known and new elements which require illustration for an understanding of the cooperation of the several parts, but which do not require detailed explanation of the known parts, at least, in order for those skilled in a particular art to comprehend the invention. Such a situation exists in this instance wherein the driving or operating means for effecting reciprocation of the reciprocable knife member 9, the ram member 10, and the division box 12 is known, but in which the means for connecting the two members 9 and 10 to the driving means is novel. Thus, a brief description of the driving means is necessary in this case although it preferably is of the kind disclosed in the previously referred to patent, No. 1,871,264.

The driving means is indicated generally in Figure 1 by the numeral 17 and includes an eccentric main shaft 18 on which is loosely mounted a pair of actuating cranks 19 and 20. The crank 19 is connected to one end of a bell crank 21, pivoted on the frame 1 as at 22, the other end of the bell crank being connected to the division box 12 by a link 23. As the eccentric shaft 18 is driven by a suitable motor (not shown) the crank 19 will be subjected to movement such that vertical reciprocating movement is imparted to the division box 12. The end of the crank 20 which is remote from the shaft 18 is pivoted to one end of a lever 24 by a pin 25, the other end of the lever 24 being pivoted on a shaft 26 carried by the frame 1. The pivot pin 25 also provides a pivotal connection for one end of a telescopic link 27. The other end of the link 27 is pivoted to an ear 28 projecting from a strap 29 secured intermediate the ends of and spanning the distance between a pair of oscillatable levers 30, the lower ends of the latter being loosely mounted on a rock shaft 31 journalled in the side walls 2 of the frame 1.

Mounted fast on the eccentric shaft 18 is a pair of cams 32, 33 which are engaged by a pair of cam followers 34, 35, respectively, the latter being mounted at the ends of a bell crank 36 mounted fast on the rock shaft 31. Also mounted fast on the rock shaft 31 is a pair of spaced levers 32. The arrangement of the cams, the cam followers, the bell crank, and the levers 32 is such that revolution of the eccentric shaft 18 will cause oscillation of the levers 32 in a direction fore and aft of the machine frame.

Through the upper ends of the oscillatable levers 32 extends a shaft 37 which is rockably journalled in bearings 38 carried by each lever 32. The shaft 37 is provided with a transverse opening adjacent to each end through each of which extends a rotatable, threaded connecting rod 39. The rear ends of the rods 39 project rearwardly of the shaft 37 and carry sprocket wheels 40 keyed or otherwise suitably fixed thereto and maintained in position at the ends of the rods by suitable nut, bolt and washer assemblies 41. Around the sprocket wheels is trained a chain 42 and one rod is provided with an extension 43 on which may be fitted a crank 44 (see Figure 3) to impart rotary movement simultaneously to each of the rods. The forward end of each of the connecting rods 39 is received in a threaded opening in a lug 45 formed on a link 46 pivotally connected adjacent to opposite sides of the knife member 9 by a lug 47 and a pivot rod 48. The arrangement of the parts is such that oscillating movement of the levers 32 will impart reciprocating movement to the knife member in a substantially horizontal path in a direction fore and aft of the machine.

The lever 30 is similarly connected to the ram member 10 by connecting means 37ᵃ—48ᵃ comprising parts corresponding to the parts identified by the reference characters 37—48. The arrangement of the parts 37ᵃ—48ᵃ is such that oscillating movement of the levers 30 will impart reciprocating movement to the ram member 10 along a path parallel to the path of the knife member 9, and the arrangement of the levers 30 and 32 is such that the movement of the ram lags the movement of the knife for a purpose to be explained.

In the operation of the parts described thus far, rotation of the eccentric shaft 18 will cause reciprocation of the knife member 9 so as to sever dough discharged into the pressure chamber from the hopper 4 and to provide an upper closure for the pressure chamber. The ram member 10 also will be moved to compress dough within the pressure chamber, but the movement of the ram lags the movement of the knife so as to enable the latter first to sever the dough and second to seal the chamber. As the ram moves forwardly, the division box is moved vertically upwardly by its operating mechanism so as to register the measuring pockets 13 with the forward end of the pressure chamber 8, thereby enabling the ram 10 to push dough into the pockets 13 whence it is ejected by the ejecting means 15 onto the conveyer 16. The positions of the parts shown in full lines in Figure 1 correspond to the positions the parts occupy when dough pieces are being ejected from the pockets. During operation of the machine, the operating parts will be covered by a number of removable cover plates, one of which is shown at 49 in Figure 1.

When it becomes necessary or desirable to clean the parts of the apparatus, the driving motor is stopped and the cover plates at the rear of the machine, including the plate 49, removed. Then the connecting rods 39 and 39ᵃ are rotated by cranks such as the crank 44 so as to cause the knife and ram members to be retracted or moved rearwardly to such positions that their forward ends are located rearwardly of the adjacent end of the hopper part 4. The retraction of the members 9 and 10 is not alone sufficient to relocate these parts in easily accessible cleaning positions, so apparatus constructed in accordance with the invention includes means generally designated 50 for swinging the members in an arcuate path to positions at an angle to the planes of reciprocation of the latter.

Figure 3:
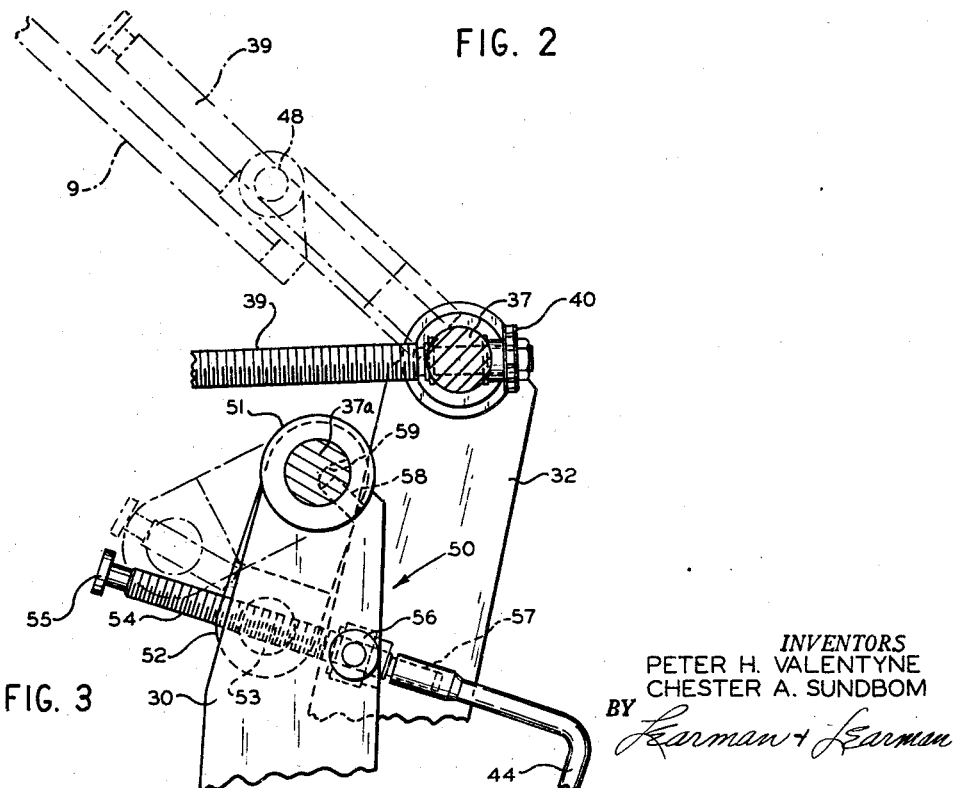
Figure 3 is a detail on an enlarged scale of a portion of the apparatus shown in Figure 1.

The knife and ram member swinging means 50 is best illustrated in Figures 1 and 3, the latter figure disclosing only means for swinging the ram member 10 for the sake of clarity. It will be recalled that each of the sets of connecting rods 39, 39ᵃ passes through or is otherwise fixed to its associated shaft 37, 37ᵃ and that each of these shafts is journalled for rotation in bearings in its associated oscillatable lever 32, 30. Referring now to Figure 3 and only to those parts which operate to swing the ram member 10, the shaft 37ᵃ has loosely mounted adjacent to each end thereof, and preferably inwardly of the levers 30, one end 51 of an operating lever 52. The other end of one of the levers 52 is apertured for the accommodation of a swivelly mounted post 53 which has a threaded opening extending diametrically therethrough. Through the opening in the post 53 extends a threaded operating rod 54, one end of which is capped or headed as at 55 and the other end of which projects through an opening in a post 56 swivelly mounted on the oscillatable lever 30 so that the openings of the two posts may always be in alignment. The end of the rod 54 which extends through the post 56 is provided with an extension 57 adapted to be accommodated in the socket of the crank 44. The arrangement is such that when the operating rod 54 is rotated by the crank 44 the operating lever will be rocked either clockwise or counterclockwise relative to the lever 30, depending on the direction of rotation of the rod. In order that the movement of the operating lever may be translated into movement of the ram member 10, the end 51 of each lever 52 is provided with an opening for the reception of a stud 58, such as a set screw, which seats in a recess 59 formed in the shaft 37ᵃ. Because there must be relative pivotal movement between the shaft 37ᵃ and the oscillatable lever 30 during reciprocation of the ram member 10, which would be prevented if the recess 59 in the shaft were only large enough to accommodate the stud 58, the recess is generally wedge or parabola shaped in cross-section so as to permit limited relative movement of the shaft and the levers 37ᵃ and 52.

The knife member 9 is provided with swinging means similar to that described in connection with the ram member, the main difference being that the knife swinging means preferably is located on the opposite side of the machine from the ram swinging means. Those parts of the knife swinging means which are visible in the drawings are numbered the same as the corresponding parts of the ram swinging means, followed by the letter *a*.

To swing the members 9 and 10 upwardly, they are retracted by operation of the connecting rods 39 and 39ᵃ, respectively, in the manner previously described. The operating lever 52ᵃ for the knife 9 then is pivoted in a clockwise direction as viewed in Figure 1 by rotation of the operating rod 54ᵃ, whereupon the studs 58ᵃ will bear against the lower faces of the wedge shaped recesses 59 and turn the shaft 38, together with the knife 9, clockwise to the position of the latter shown in chain lines in Figures 1 and 3. After the knife has been swung up it will remain in that position by engagement between the stud 58 and the wall of the recess 59, whereupon the ram 10 may be similarly swung so that it occupies the position shown in chain lines in Figure 1. In these positions of the parts, the knife and ram are easily accessible for cleaning and lubrication.

To return the members 9 and 10 to their operative positions, the respective operating rods 52ª and 52 are rotated in the reverse direction until the members are again positioned in substantially parallel, horizontal planes, whereup the connecting rods 39 and 39ª may be rotated to advance the members forwardly between the hopper 4 and the table top. To assure that the members will not be advanced so far as to damage parts of the apparatus during operation, each of the connecting rods is provided with an enlargement A at its forward end for engagement with the parts 45 and 45ª.

Not only is it important to clean and lubricate the knife and ram members; it also is necessary that the parts associated therewith be made accessible for cleaning and lubrication. Thus, the invention includes the provision of means for enabling access to be had to the division box and to the working space between the hopper and the table 5. This means is indicated generally by the reference character 60 and comprises at least one threaded shaft 61 journalled adjacent to its rear end in a part 62 supported by the frame 1. The other end of the shaft 61 is received in a threaded block 63 which is rigidly secured to the rear edge of the table 5 by bolt and nut assemblies, one of which is shown at 64 in Figure 1. The rear end of the shaft 61 is fitted with a head 65 adapted to receive a crank 66 by means of which the shaft 61 may be rotated. When expedient, two shafts 61 may be employed and they may be interconnected for conjoint operation by sprocket wheels and chains similar to the arrangement of those indicated at 40, 40ª, 42, and 42ª. When the ram and knife members are swung to their cleaning positions, the shaft or shafts 61 may be so rotated as to cause rearward movement of the table 5. Since the table is connected to the hopper 4, the latter also may be moved rearwardly to the positions shown in chain lines in Figure 1, thereby spacing the parts 4 and 5 from the rear wall of the division box 12 so as to enable these parts to be cleaned and lubricated. To restore the parts to their operative condition, it is necessary only to rotate the shaft or shafts 61 in the reverse direction.

The disclosed embodiment is representative of a presently preferred form of the invention, but is intended to be illustrative rather than definitive of the invention. The invention is defined in the claims.

We claim:

1. In dough dividing apparatus of the kind including a hopper part, a table part connected to said hopper part on which dough discharged from said hopper may be received, a knife member reciprocable along a planar path between forward and rearward positions for shearing dough discharged from said hopper part, a ram member reciprocable along a substantially parallel path for pushing sheared dough off said table part, a division box into which said ram member may push said sheared dough, and means for reciprocating said members, the combination of means connected to said members for moving the latter to such positions as to enable them to be swung in arcuate paths to positions lying in planes at an angle to the planes of reciprocation of said members; and means for swinging said members.

2. The combination set forth in claim 1 including means connected to one of said parts for moving said parts along a path substantially parallel to the planes of reciprocation of said members.

3. In dough dividing apparatus of the kind including a frame, a hopper part movably supported by the frame from which dough may be discharged, a table part connected to said hopper part and so positioned relatively to said hopper part as to receive dough discharged from the latter, and an element supported by said frame adjacent to said parts to receive dough from said table part, the combination of means connected to one of said parts for effecting movement of said parts relatively to said frame to provide space between said parts and said element for facilitating cleaning of said parts.

4. Dough dividing apparatus comprising a frame; a hopper part mounted on said frame and from which dough may be discharged; a table part mounted on said frame in a position to receive dough discharged from said hopper part; a knife member supported on said frame in a position between said hopper part and said table part for reciprocating movement in a path to sever dough discharged from said hopper part; a ram member supported by said frame in a position between said knife member and said table part for reciprocating movement in a path to push severed dough off said table part; means connected to said members for reciprocating them; means connected to said members for withdrawing the latter from between said parts; and means connected to said members for moving said members when so withdrawn to positions removed from said paths to enable access to be had to said members for cleaning same.

5. Apparatus as set forth in claim 4 in which said parts are connected to one another and including means connected to one of said parts for effecting relative movement of said parts and said frame.

6. Apparatus as set forth in claim 4 in which the means connected to said members for reciprocating them includes an oscillatable lever; a connecting rod; means pivotally connecting one end of said connecting rod to said lever; means pivotally connecting the other end of said connecting rod to one of said members; and means interposed between said oscillatable lever and said connecting rod for limiting pivotal movement therebetween.

7. Apparatus as set forth in claim 4 in which the means connected to said members for reciprocating them includes an oscillatable lever; a connecting rod; means pivotally connecting one end of said connecting rod to said lever; and means pivotally connecting the other end of said connecting rod to one of said members, and in which said means for moving said members includes an operating lever connected to said pivotal connecting means at said one end of said connecting rod; and adjustable means interconnected between said operating lever and said oscillatable lever for effecting movement of said operating lever, said pivotal means at said one end of said connecting rod, and said connecting rod relative to said oscillatable lever.

8. Apparatus as set forth in claim 7 including means interposed between said oscillatable lever and said pivotal means at said one end of said connecting rod for limiting relative pivotal movement of said connecting rod and said pivotal means at said one end of said connecting rod.

9. Dough dividing apparatus comprising a frame; a hopper part supported by said frame from which dough may be discharged; a table part supported by said frame in a position to receive dough discharged from said hopper part; a knife member mounted between said parts for severing dough discharged from said hopper part; a ram member mounted between said parts for propelling severed dough off said table part; and means for effecting movement of each of said members in arcuate paths relative to said parts, each of said means including a shaft, connecting rods fixed to said shaft and extending between said shaft and its associated member, a lever supporting said shaft for rotation, an operating lever having one end mounted on said shaft for rotation therewith, adjustable means at the other end of said operating lever adjustably connecting said operating lever to said first mentioned lever, said adjustable means being operable to effect relative movement between said first mentioned lever and said operating lever about the axis of said shaft whereby said connecting rods and said associated member may be swung in an arcuate path about the axis of said shaft.

10. Apparatus as set forth in claim 9 in which the connection between said operating lever and said shaft comprises a stud projecting from said operating lever into a recess in said shaft, said recess being of such size relative to said stud as to permit limited pivotal movement between said operating lever and said shaft.

11. Apparatus as set forth in claim 9 including means connected between said parts and said frame for effecting relative movement therebetween.

12. In dough dividing apparatus of the kind including a knife member reciprocable along a planar path, a ram member reciprocable along a path substantially parallel to the path of reciprocation of said knife member, oscillatable driving means, and means rockably interconnecting said driving means and said members for reciprocating the latter, the combination of means connected to said driving means and to said interconnecting means for rocking said members to positions lying in planes at an angle to the paths of reciprocation of said members.

13. The combination set forth in claim 12 wherein said interconnecting means is adjustable relatively to said driving means for adjusting the positons of said members along their paths of reciprocation.

14. In dough dividing apparatus of the kind including a hopper, a knife member and a ram member below and adjacent to said hopper and normally reciprocable along substantially planar paths, means for reciprocating said members, and means for shifting at least one of said members along its path to a position clear of said hopper, the combination of means connected to said one of said members for displacing the latter from its said path when said one of said members is shifted to said position.

15. Apparatus as set forth in claim 14 wherein said shifting means forms part of but is adjustable relatively to said reciprocating means.

16. Dough dividing apparatus comprising a frame; a hopper mounted on said frame and from which dough may be discharged; a table mounted on said frame for receiving dough discharged from said hopper; a knife member mounted between said hopper and said table and normally being reciprocable to and fro to shear dough discharged from said hopper; a ram member mounted between said hopper and knife member and normally being reciprocable to and fro to push sheared dough off said table; driving means; and motion transmission means interconnecting said driving means and said members for reciprocating the latter, said motion transmission means being provided with means for withdrawing said members from between said table and hopper to positions enabling access to be had to said members for cleaning.

References Cited in the file of this patent

UNITED STATES PATENTS

| | | |
|---|---|---|
| 602,262 | La France | Apr. 12, 1898 |
| 850,074 | Streich | Apr. 9, 1907 |
| 1,871,264 | Eggert | Aug. 8, 1932 |
| 2,176,905 | King | Oct. 24, 1939 |
| 2,609,765 | Pointon | Sept. 9, 1952 |
| 2,791,188 | Vierow | May 7, 1957 |